W. T. CLARK.
METER.
APPLICATION FILED JUNE 11, 1913.

1,401,315.

Patented Dec. 27, 1921.
4 SHEETS—SHEET 1.

WITNESSES:
G. R. Quimby
F. Graves.

INVENTOR
William T. Clark
BY
C. W. Marshall
ATTORNEY.

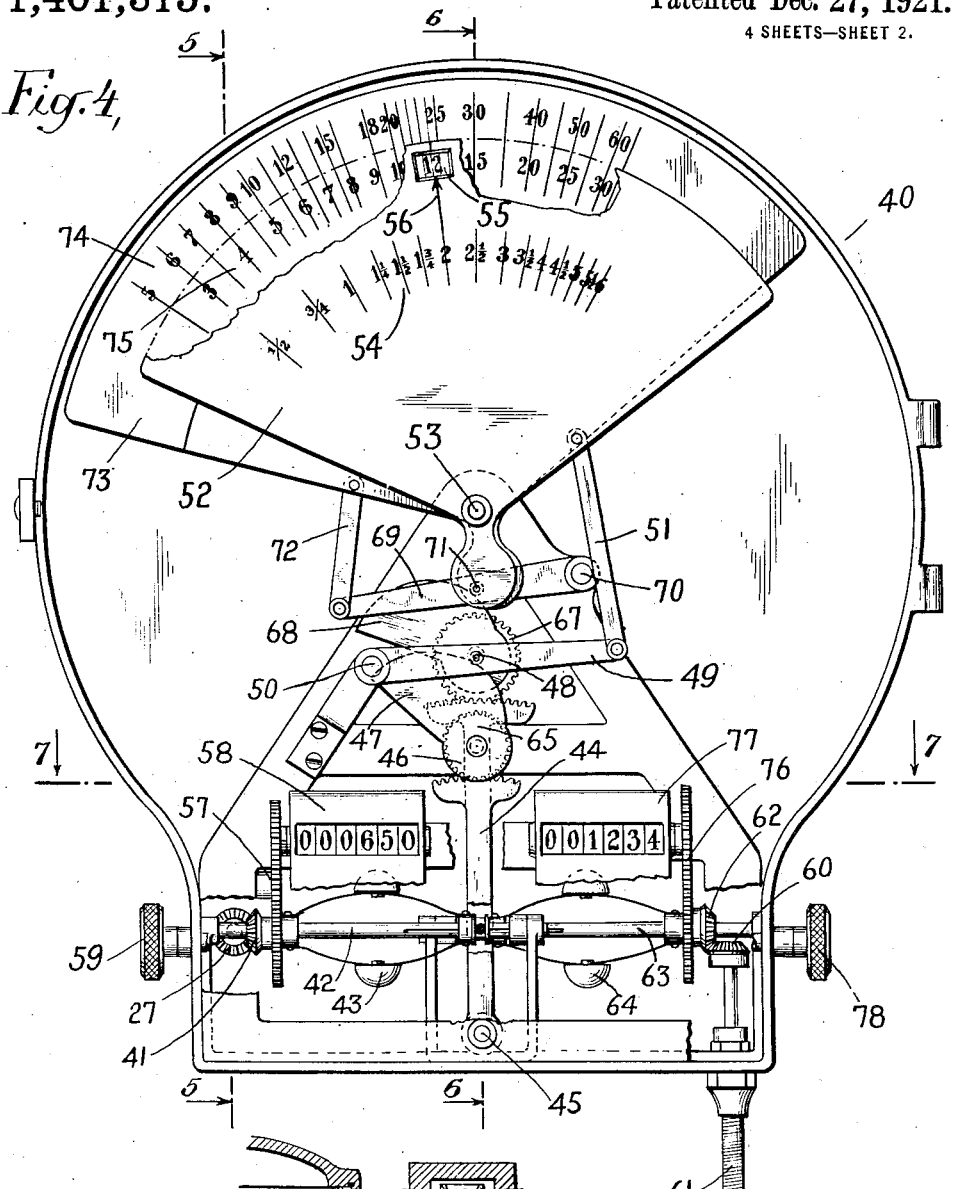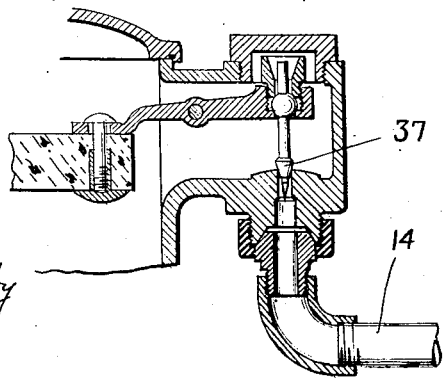

W. T. CLARK.
METER.
APPLICATION FILED JUNE 11, 1913.
1,401,315.
Patented Dec. 27, 1921.
4 SHEETS—SHEET 3.
Fig.5,
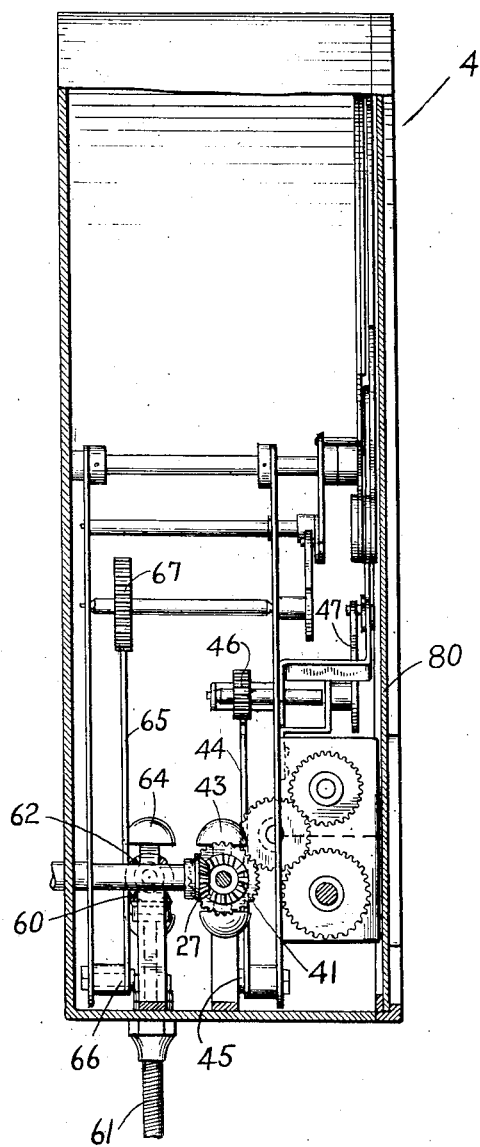
Fig.6,
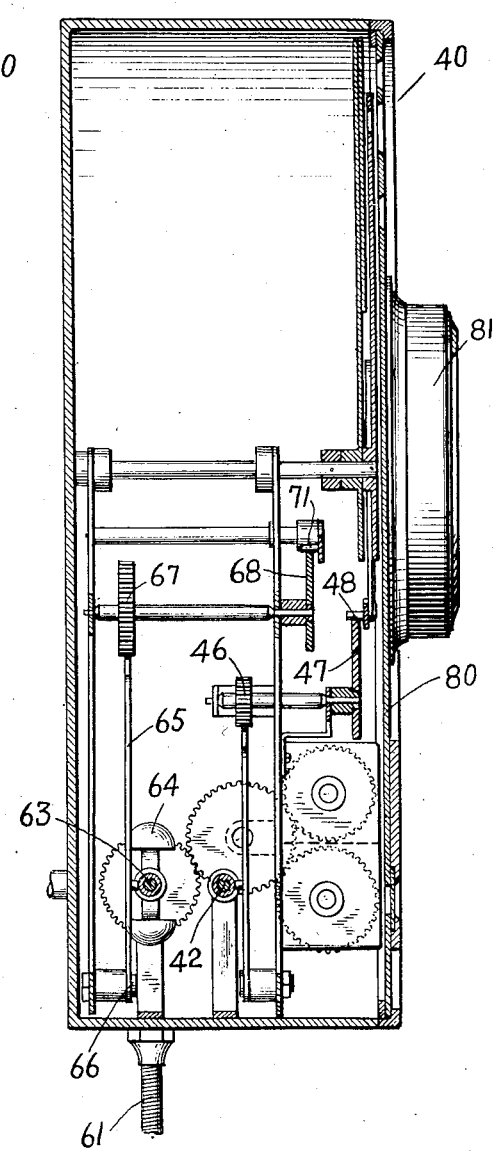
WITNESSES:
G. R. Quimby
J. Graves
INVENTOR
William T. Clark
BY
E. W. Marshall
ATTORNEY W. T. CLARK.
METER.
APPLICATION FILED JUNE 11, 1913.
1,401,315.
Patented Dec. 27, 1921.
4 SHEETS—SHEET 4.
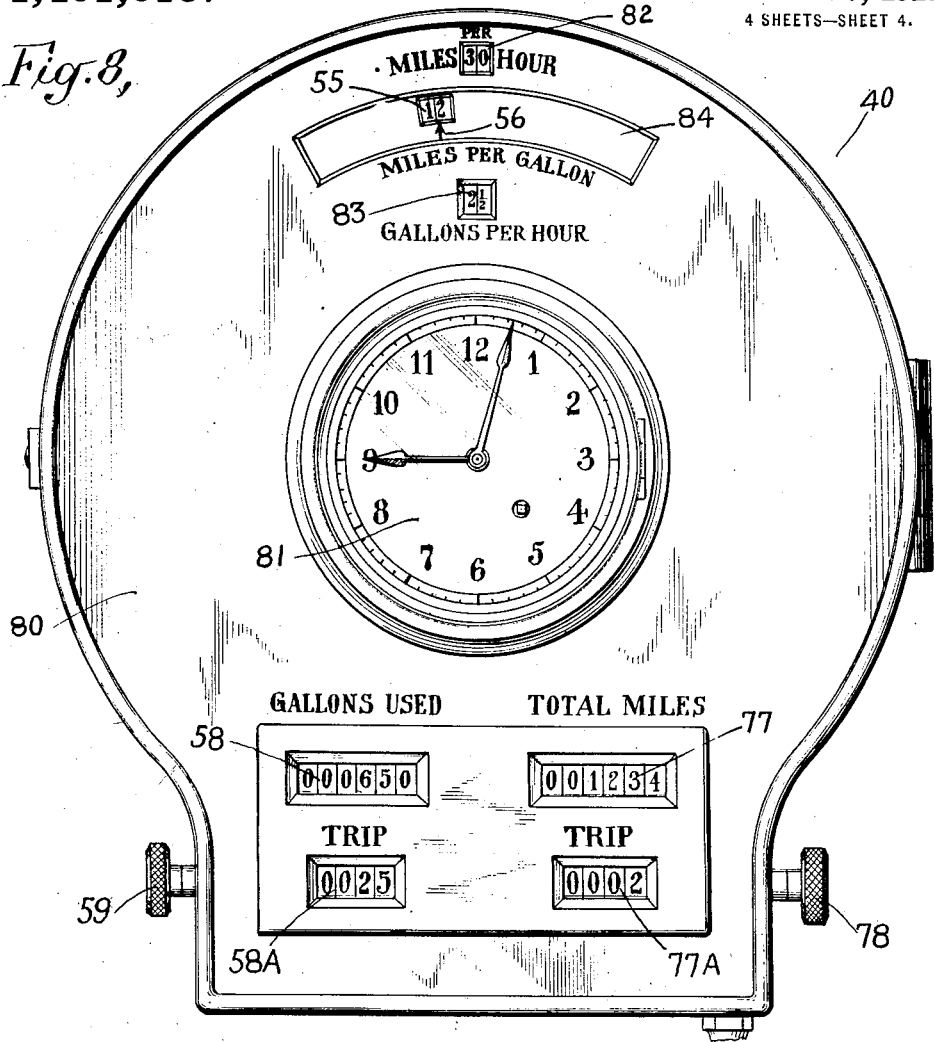
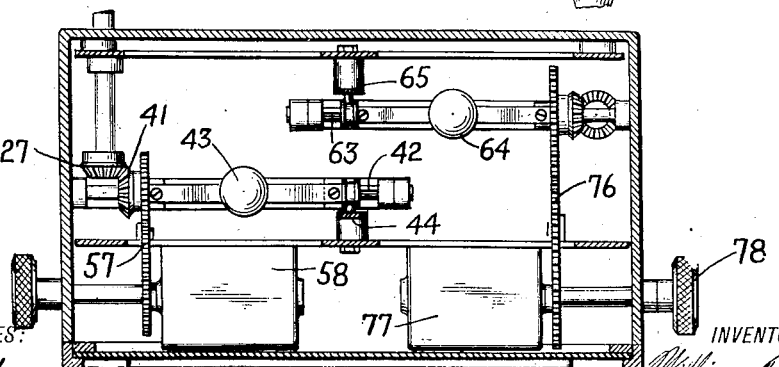

UNITED STATES PATENT OFFICE.

WILLIAM T. CLARK, OF PHILADELPHIA, PENNSYLVANIA, ASSIGNOR OF ONE-HALF TO E. W. MARSHALL, OF YONKERS, NEW YORK.

METER.

1,401,315. Specification of Letters Patent. Patented Dec. 27, 1921.

Application filed June 11, 1913. Serial No. 772,949.

*To all whom it may concern:*

Be it known that I, WILLIAM T. CLARK, a citizen of the United States, and a resident of Philadelphia, in the county of Philadelphia, State of Pennsylvania, United States of America, have invented certain new and useful Improvements in Meters, of which the following is a specification, reference being had to the accompanying drawings, forming a part thereof.

My invention relates to meters for measuring the flow of liquids and particularly to meters for measuring the flow of liquid fuel to combustion engines. Its object is to provide a simple apparatus of this character which may be used on motor vehicles by means of which the rate of flow of the fuel may be indicated and the amount used registered.

Another object of the invention is to combine the measurement thus obtained with a measurement of the speed of the vehicle to show the efficiency of the vehicle.

These, and other objects of the invention will appear in the following specification in which I will describe my invention, the novel features of which will be set forth in appended claims.

Referring to the drawings,

Fig. 3 is a sectional elevation of the float valve of a carbureter.

In Fig. 4 the meter is shown in front elevation with its dials and cover removed and with certain parts broken away to more clearly show its construction.

Figs. 5 and 6 are sectional side elevations of the meter, the sections being taken respectively on the lines 5—5 and 6—6 of Fig. 4.

Fig. 7 is a sectional plan view of the meter, the section being taken on the line 7—7 of Fig. 4.

The meter is shown in front elevation in Fig. 8.

Like characters of reference designate corresponding parts in all the figures.

Figure 1:
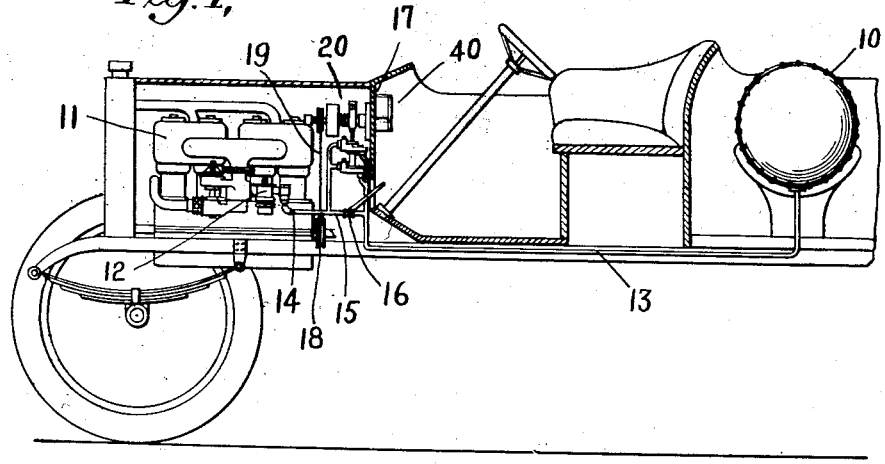
Figure 1 is a sectional elevation of a portion of an automobile showing its fuel tank, its engine and the connecting fuel pipe with my meter interposed therein between the tank and the engine.

In Fig. 1, 10 designates the fuel tank of an automobile and 11 its engine. 12 designates the carbureter. The meter actuating mechanism is designated as a whole by 20. A fuel pipe 13 leads from the tank to this mechanism and a similar pipe 14 leads from this mechanism to the carbureter. The pipes 13 and 14 are connected outside of the actuating mechanism by a branch pipe 15 in which is a manually operable self-closing valve 16. The dash of the vehicle is designated by the reference numeral 17.

On the engine shaft is a pulley 18 which is connected with the actuating mechanism by a belt 19.

Figure 2:
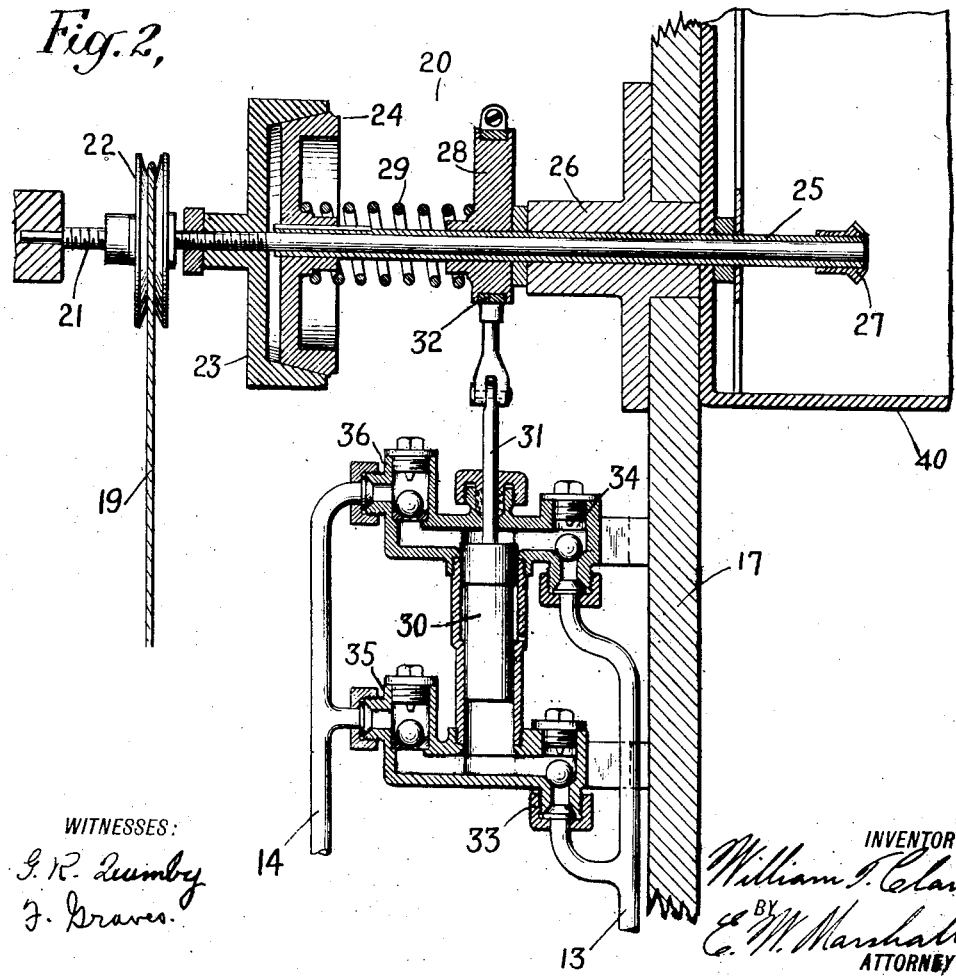
Fig. 2 is a sectional elevation of the meter actuating mechanism.

The actuating mechanism 20 which is fully illustrated in Fig. 2 comprises a shaft 21 to which is affixed a pulley 22 which is driven by the engine by means of the belt 19. On this shaft is a friction clutch of which one member 23 is mounted upon shaft 21 in such a manner that it is driven by the shaft and that its position on the shaft may be adjusted. Another member 24 of the clutch is splined to a sleeve 25 which is rotatably supported in a bearing 26 on the dash 17. This sleeve runs through the dash and into the meter which is on the rear of the dash and which is designated as a whole by the reference numeral 40. On this end of the sleeve is a bevel gear 27 which is connected to drive the meter mechanism.

28 is an eccentric affixed to sleeve 25 and between this eccentric and the clutch member 24 is a compression spring 29 which tends to press the clutch members 23, 24 together.

The piston 30 of a double acting pump is connected by a rod 31 and a strap 32 to be reciprocated by the eccentric 28. The fuel pipe 13 is connected with the ends of the pump through check valves 33, 34 and the pipe 14 is connected with the ends of the pump through check valves 35, 36. The checks are so set that the liquid fuel is drawn into the pump from the pipe 13 and is discharged from the pump into the pipe 14.

The pipe 14 leads to the carbureter and the liquid discharged from the pump is admitted to the carbureter through a float controlled needle valve 37. This is of the ordinary construction and is arranged in the usual manner so that it is closed when the float chamber contains a predetermined quantity of liquid fuel and is opened more or less when the liquid in the float chamber is below the desired level.

Before describing the construction of the meter, I will point out the operation of its actuating mechanism. The carbureter may be filled by opening valve 16. The engine may then be started and by its connection with the pump will supply the liquid fuel to the carbureter as it is used up by the engine.

The parts are so adjusted that the pump feed is slightly in excess of the amount of liquid used when the pump is driven at a rate proportional to the engine speed. Consequently the float chamber of the carbureter will be filled and its float will automatically close its valve 37. This will put a back pressure on the pump discharge which will result in a slip between the members 23, 24 of the clutch. The pressure between these members may be nicely regulated by adjusting the position of the member 23 on the shaft. The member 24 will however be rotated at a sufficient rate to keep the carbureter supplied and the rate of rotation of the gear 27 will always be the same as that of the clutch member 24 and consequently will be proportional to the rate of flow of the fuel from the tank to the engine.

I utilize this proportional rate of rotation of the gear 27 to actuate a meter which will indicate the rate of flow of fuel and register the total amount of its flow. I also combine with the aforesaid indicating of the rate of fuel flow, a vehicle speed indication to indicate at any time the speed for a given rate of fuel flow. A mechanism for accomplishing this result is shown in the drawings.

The meter as a whole which is designated by the reference numeral 40 may be conveniently placed on the dash 17 in view of the operator.

The gear 27 is in mesh with a gear 41 affixed to a shaft 42 on which is a centrifugal governor 43. This is connected with an arm 44 which is pivoted at 45 and arranged to pull the arm over to the left when the governor is actuated. On the upper end of this arm is a segmental gear which meshes with a pinion 46 which carries on its shaft a logarithmic cam 47. This cam acting upon a pin 48 which projects from an arm 49, swings this arm upward about its pivot 50. The other end of arm 49 is connected by a link 51 with a dial 52 which is pivoted at 53. This dial is logarithmically graduated as at 54 with numerals thereon which indicate units of volume,—preferably gallons and fractions thereof.

The dial 52 extends beyond its graduations and is provided with an opening 55 and also bears an arrow 56 which points to the center of this opening.

The shaft 42 is also connected by suitable gearing 57 with a register 58, the lower portion of which is broken away in Fig. 4.

The meter may be also provided with a gear 60 driven by a flexible shaft 61 from one of the wheels of the vehicle in the well known manner. This gear meshes with a gear 62 on a shaft 63 to actuate a governor 64 thereon. This governor is so connected that when actuated it moves to the right an arm 65 which is pivoted at 66. A segmental gear at the upper end of arm 65 meshes with a pinion 67 which carries on its shaft a logarithmic cam 68. This cam is arranged to allow an arm 69 to swing downward about its pivot 70 by co-acting with a pin 71 projecting from the arm. The other end of arm 69 is connected by a link 72 with a dial 73 which is directly back of dial 52 and with the latter is pivoted at 53.

Upon dial 73 are logarithmic graduations 74 with numerals thereon arranged to indicate units of space, preferably miles. These graduations have other indicating numerals thereon at 75 which are concentric with the other numerals and are so placed as to register with the opening 55 in dial 52.

Connected with shaft 63 by suitable gearing 76 is a register 77 the lower part of which is broken away in Fig. 4.

80 is a meter face upon which if desired, may be mounted a clock 81. This face covers the mechanism except at certain portions where openings are provided for the purpose of making the graduations and indicating figures of the dials 52 and 73 visible and also the figures of the registers 58 and 77.

In the upper central portion of the meter face is an opening 82 with the words "Miles per hour" adjacent. The graduations and figures on the dial 73 at 74 register with this opening and are successively visible through it as the dial is actuated through the mechanism described, by the movement of the vehicle. The various parts are so arranged and adjusted that the figures visible through the opening 82 will indicate at any time the speed at which the vehicle is traveling.

Below this is another opening 83 in the dial with the words "Gallons per hour" adjacent. The graduations and figures on dial 52 at 54 register with this opening. The parts are so arranged and adjusted that the figures visible through opening 83 will indicate the rate of fuel flow from the tank 10 to the engine.

Between the openings 82 and 83 is a curved opening 84 concentric with the figures at 75 on dial 73 and of sufficient width to make these figures visible through the opening 55 in dial 52 and to show the arrow 56 thereon. The words "Miles per gallon" are adjacent opening 84. The logarithmic scales on the two dials are of like graduation and are so relatively disposed as to cause the arrow 56 to point to a figure on scale 75 which is the quotient of miles per hour divided by gallons per hour which is obviously the miles being covered by the vehicle per gallon of fuel used.

The actuating mechanism for the speedometer scale 73 is geared to actuate the register 77 in the usual way and the register is preferably provided with a secondary set of figures as at 77$^A$ which may be set back to zero at the beginning of each trip by means of a button 78. This is a common arrangement and so needs no detailed description here.

In the same way the actuating mechanism for the fuel meter is geared to actuate the register 58 which is calibrated to read gallons and its secondary set of figures which can be reset by means of the button 59 also reads gallons. The upper register 58 then shows the total fuel consumption and its lower secondary register 58$^A$ shows the gallons used since the last resetting which may be at the beginning of a trip or after a refilling of the tank.

I have shown the meter actuating mechanism driven from the engine shaft, but for the purposes of this invention, it is only necessary that some means be provided for actuating the meter in proportion to the flow of fuel to the engine. I prefer to have a more positive drive, and to provide some device for driving the clutch member at a rate proportional to the speed of the engine.

The other mechanisms shown and described are merely illustrative of one embodiment of my invention but of course other arrangements may be employed within the scope of the invention and the limitations of the claims.

What I claim is:

1. A pipe adapted to lead fuel to a combustion engine, a valve arranged to automatically limit the flow of fuel to the engine, a pump arranged to be driven by the engine at a rate to deliver fuel to the engine faster than said valve permits it to flow, means between the engine and the pump for allowing the movement of the pump to be retarded and means for indicating the rate of movement of the pump.

2. A combustion engine fuel meter, an actuating mechanism therefor comprising an engine driven member, a meter driving member and a slip connection between said members external to said meter adapted to variably control the speed of said meter driving member.

3. A combustion engine fuel meter, an actuating mechanism therefor comprising an engine driven member, a meter driving member, a slip connection between said members and a regulating device external to said meter for variably controlling said slip connection 4. A combustion engine fuel meter, an actuating mechanism therefor, a valve arranged to limit the flow of fuel to the engine, an automatic controlling device for said valve, said actuating mechanism comprising an engine driven member, a meter driving member, and a slip connection between said members external to said meter controlled by said valve.

5. A combustion engine fuel meter, an actuating mechanism therefor comprising an engine driven member, a meter driving member and a slip connection between said members, a centrifugal governor adapted to variably regulate the degree of slip of said connection and an indicating dial connected with the governor.

6. A combustion engine, a fuel tank, a pipe connecting the tank with the engine, an inclosed meter, an actuating mechanism for the meter interposed between the tank and the engine, a valve arranged to limit the flow of fuel to the engine, an automatic controlling device for said valve, said actuating mechanism comprising an engine driven member, a meter driving member, and a slip connection between said members external to said meter controlled by said valve, adapted to variably control the speed of said meter driving member proportionally to the flow of fuel.

7. A combustion engine, a fuel tank, a pipe connecting the tank with the engine, an inclosed meter, an actuating mechanism for the meter interposed between the tank and the engine, a valve arranged to limit the flow of fuel to the engine, an automatic controlling device for said valve, said actuating mechanism comprising an engine driven member, a meter driving member, a slip connection between said members external to said meter controlled by said valve, and means for regulating the slip of said connection.

8. A pipe adapted to lead fuel to a combustion engine, an inclosed pump in said pipe arranged to be driven by the engine, a valve in the fuel pipe arranged to limit the rate of movement at which the pump may be driven, automatic means external to said pump adapted to variably control said valve according to the rate of flow of fuel and a meter connected with the pump.

9. A combustion engine fuel meter, an actuating mechanism therefor comprising an engine driven member and a meter driving member, an inclosed fuel pump connected with the meter driving member, a valve arranged to automatically limit the rate of movement of the pump and the meter driving member, and a friction clutch external to said pump and adapted to automatically limit the speed of the pump and the meter driving member according to the flow of fuel.

10. A combustion engine, a fuel tank, a pipe connecting the tank with the engine, a meter, an actuating mechanism for the meter interposed between the tank and the engine comprising an engine driven member, a meter driving member, and a friction clutch forming a slip connection between said members; a fuel pump connected with the meter driving member, and a valve in the fuel pipe between the pump and the engine arranged to variably regulate the degree of slip of said connection according to the rate of flow of fuel.

11. Combustion engine fuel measuring means comprising an engine driven member, a member for driving said measuring means, and a friction clutch forming a slip connection between said members; said clutch having a spring and a variably adjustable device therefor by which the amount of slip of said connection may be regulated during the operation of the engine, a fuel pump connected with the member driving said measuring means, and a valve in the fuel pipe arranged to automatically limit the rate of movement of the pump and the member driving said measuring means, a centrifugal governor connected with the member driving said measuring means and indicating means for indicating the rate of flow of fuel through said pump.

12. An engine fuel meter comprising an indicating element, a reciprocating mechanism therefor arranged to move said indicating element in proportion to the rate of flow of fuel to the engine, combined with engine driven mechanism, a speed indicator for indicating the speed of said engine driven mechanism, said fuel indicating element and said speed indicator being arranged to jointly give an indication.

13. A pipe adapted to lead fuel to a combustion engine, a pump arranged to be actuated by the engine at variable rates to deliver fuel to the engine according to engine requirements, and means for indicating the rate of movemnt of the pump, combined with mechanism adapted to be driven by the engine, a speed indicator adapted to indicate the speed of said mechanism arranged with said pump indicating means to jointly give an indication.

14. A pipe adapted to lead fuel to a combustion engine, a valve arranged to limit the flow of fuel to the engine, an automatic controlling device for said valve, a pump arranged to be driven by the engine at a rate to deliver fuel to the engine faster than said valve permits it to flow and means between the engine and the pump for allowing the movement of the pump to be retarded by said valve, and means for indicating the rate of movement of the pump, combined with mechanism driven by said engine, a speed indicator for indicating the rate of movement of said mechanism arranged with said pump indicating means to jointly give an indication.

15. A combustion engine fuel meter, an actuating mechanism therefor, a valve arranged to limit the flow of fuel to the engine, an automatic controlling device for said valve, said actuating mechanism comprising an engine driven member, a meter driving member, a slip connection between said members controlled by said valve, and an indicating element; combined with engine driven mechanism, a speed indicator for indicating the speed of said mechanism arranged with said indicating element to jointly give an indication.

16. A combustion engine fuel meter, an actuating mechanism therefor comprising an engine driven member, a meter driving member and a slip connection between said members, a centrifugal governor and an indicating dial, combined with engine driven mechanism, a speed indicator for indicating the speed of said mechanism having a dial arranged with said indicating dial to jointly give an indication.

17. A combustion engine fuel meter comprising an indicating element, and a reciprocating mechanism therefor arranged to actuate said indicating element in proportion to the rate of flow of fuel to the engine, combined with engine driven mechanism, a speed indicator for indicating the speed of said engine driven mechanism having a dial arranged with said indicating element to jointly give an indication.

18. A combustion engine fuel meter, comprising an engine driven member, a meter driving member, and a friction clutch forming a slip connection between said members; said clutch having a spring and a variably regulatable device therefor by which the amount of slip of said connection may be automatically regulated, a fuel pump connected with the meter driving member, and a valve in the fuel pipe arranged to automatically limit the rate of movement of the pump and the meter driving member, a centrifugal governor connected with the meter driving member and an indicator dial connected with said governor and adapted to indicate the rate of flow of fuel through said pump combined with a speed indicator having a dial arranged with said meter indicator dial to jointly give an indication.

19. A combustion engine fuel meter, an actuating mechanism therefor comprising an engine driven member, a meter driving member and a friction clutch forming a slip connection between said members; said clutch having a spring and an adjusting device therefor by which the amount of slip of said connection may be changed, a fuel pump connected with the meter driving member, and a valve in the fuel pipe arranged to automatically limit the rate of movement of the pump and the meter driving member, a centrifugal governor connected with the meter driving member, an indicating dial connected with said governor and a register connected with the meter driving member; combined with engine driven mechanism, a speed indicator for indicating the speed of said mechanism having a dial arranged with said indicating dial to jointly give an indication, and a register connected with the speed indicator adapted to register the indications of said dials.

20. In a vehicle, a combustion engine, a fuel tank, a pipe connecting the tank with the engine, means for indicating the rate of flow of fuel to said engine, an actuating mechanism for said indicating means interposed between the tank and the engine, a valve arranged to limit the flow of fuel to the engine, an automatic controlling device for said valve, said actuating mechanism comprising an engine driven member, a member for driving said indicating means, a slip connection between said members controlled by said valve, means for regulating the slip of said connection, a centrifugal governor connected with the member driving said indicating means adapted to variably regulate the speed of said driving member and an indicating dial; combined with a speed indicator adapted to indicate the speed of the vehicle having a dial arranged with said indicating dial to jointly give an indication.

21. In a vehcile, a combustion engine, a fuel tank, a pipe connecting the tank with the engine, means for indicating the rate of flow of fuel to said engine, an actuating mechanism for said indicating means interposed between the tank and the engine comprising an engine driven member, a member for driving said indicating means, and a friction clutch forming a slip connection between said members; said clutch having a spring and an adjusting device therefor by which the amount of slip of said connection may be changed, a fuel pump connected with said driving member, and a valve in the fuel pipe between the pump and the engine arranged to automatically limit the rate of movement of the pump and said driving member proportional to the flow of fuel, a centrifugal governor connected with said driving member, an indicating dial connected with said governor and a register connected with said driving member; combined with a speed indicator having a dial for indicating the speed of said vehicle arranged with said indicating dial to coöperate to give an indication.

22. The combination with a prime mover, a mechanism driven by said prime mover, indicating means for indicating the input to said prime mover, a logarithmic scale for said means, a second indicating means for indicating the rate of speed of said mechanism, a logarithmic scale for said second means, said scale being juxtaposed and adapted to coöperate to give an indication of the extent of movement of said mechanism on a predetermined unit of input.

23. A combustion engine fuel meter having a dial with a logarithmic scale thereon, an actuating mechanism arranged to actuate said dial in logarithmic proportion to the rate of flow of fuel to the engine, combined with a speed indicator, having a dial with a logarithmic scale thereon, an actuating device therefor arranged to actuate the speed indicator dial in logarithmic proportion to a function of the speed of the engine, said scales being juxtaposed and arranged to jointly give an indication.

24. In combination with an internal combustion engine provided with a carbureter, a fuel supply pipe leading to said carbureter and a check valve for admitting fuel to the carbureter only as fast as the same is consumed by the engine, an inclosed pump interposed in the fuel supply pipe for forcing fuel to the carbureter at a rate controlled by the automatic check valve, a shaft external to said pump driven constantly by the engine, a clutch element fixed on said shaft and operating at all times at a speed proportionate to the engine speed, a companion clutch element in slipping engagement at all times with said relatively fixed clutch element and external to said pump, a meter driven by said slipping clutch element and driving means for the pump fixed to said slipping clutch element and serving to operate the pump only as the slipping clutch element is operated by the relatively fixed clutch element.

25. In combination with an internal combustion engine provided with a carbureter, a fuel supply pipe leading to said carbureter and a check valve for admitting fuel to the carbureter only as fast as the same is consumed by the engine, an inclosed pump interposed in the fuel supply pipe for forcing fuel to the carbureter at a rate controlled by the automatic check valve, a shaft external to said pump driven constantly by the engine, a clutch element fixed on said shaft and operating at all times at a speed proportionate to the engine speed, a companion clutch element external to said pump in slipping engagement at all times with said relatively fixed clutch element, a meter driven by said slipping clutch element, driving means for the pump fixed to said slipping clutch element and serving to operate the pump only as the slipping clutch element is operated by the relatively fixed clutch element, said driving means including a shaft engaged with the slipping clutch element, an eccentric member on said shaft and a connecting rod engaged by said eccentric member and connected with the pump, said pump being of the reciprocating type and therefore operated from the eccentric member with a constant stroke at all times but at a variable rate of speed depending upon the degree of slippage between the driving and driven clutch elements.

In witness whereof I have hereunto set my hand this 9th day of June in the year 1913.

WILLIAM T. CLARK.

Witnesses:
EDWIN J. WILLIAMS,
CHAS. H. DEDAKER.